United States Patent
Chen

(10) Patent No.: US 10,838,234 B2
(45) Date of Patent: Nov. 17, 2020

(54) CONTACT LENS WITH IMPROVED VISUAL PERFORMANCE AND MINIMIZED HALO UTILIZING PUPIL APODIZATION

(71) Applicant: Johnson & Johnson Vision Care, Inc., Jacksonville, FL (US)

(72) Inventor: Minghan Chen, St. Johns, FL (US)

(73) Assignee: Johnson & Johnson Vision Care, Inc., Jacksonville, NJ (US)

( * ) Notice: Subject to any disclaimer, the term of this patent is extended or adjusted under 35 U.S.C. 154(b) by 0 days.

(21) Appl. No.: 15/240,025

(22) Filed: Aug. 18, 2016

(65) Prior Publication Data
US 2018/0052335 A1 Feb. 22, 2018

(51) Int. Cl.
| | | |
|---|---|---|
| *G02C 7/04* | (2006.01) | |
| *G02C 7/16* | (2006.01) | |
| *G02B 27/00* | (2006.01) | |
| *G02B 27/58* | (2006.01) | |
| *G02C 7/10* | (2006.01) | |

(52) U.S. Cl.
CPC ......... *G02C 7/049* (2013.01); *G02B 27/0025* (2013.01); *G02B 27/58* (2013.01); *G02C 7/04* (2013.01); *G02C 7/104* (2013.01); *G02C 7/16* (2013.01)

(58) Field of Classification Search
CPC .................................................. G02C 7/04–049
USPC ....................................... 351/159.02–159.38
See application file for complete search history.

(56) References Cited

U.S. PATENT DOCUMENTS

| | | | | |
|---|---|---|---|---|
| 5,260,727 A | | 11/1993 | Oksman | |
| 5,662,706 A | * | 9/1997 | Legerton | A61F 2/1613 351/159.08 |
| 5,905,561 A | * | 5/1999 | Lee | G02C 7/16 351/159.02 |
| 6,338,559 B1 | * | 1/2002 | Williams | A61B 3/1015 351/212 |

FOREIGN PATENT DOCUMENTS

| | | | | |
|---|---|---|---|---|
| CN | 101438203 | | 5/2009 | |
| CN | 101438203 A | * | 5/2009 | ............. G02C 7/042 |
| CN | 101932967 | | 12/2010 | |
| CN | 101932967 A | * | 12/2010 | ............. G02C 7/028 |
| DE | 102007015599 A1 | | 10/2008 | |
| WO | WO1997048004 A1 | | 12/1997 | |
| WO | WO2008119405 A1 | | 10/2008 | |
| WO | WO2013093916 | | 6/2013 | |
| WO | WO-2013093916 A1 | * | 6/2013 | ............... G02C 7/02 |
| WO | WO2013154768 A1 | | 10/2013 | |
| WO | WO2014156607 | | 10/2014 | |
| WO | WO2015108211 A1 | | 7/2015 | |

OTHER PUBLICATIONS

Nave, "Gaussian Distribution Function", waybackmachine capture of web document on Nov. 24, 1999, obtained from the waybackmachine Aug. 8, 2018, with a current more legible copy obtained from hyperphysics.phy-astr.gsu.edu on Aug. 8, 2018.*
European Search Report for corresponding EPA No. 17186690.8 dated Jan. 23, 2018.

* cited by examiner

*Primary Examiner* — Cara E Rakowski

(57) ABSTRACT

A soft contact lens designed to improve visual performance with reduced pupil edge wavefront aberration, reduced halo and reduced light scattering. The soft contact lens is designed with pupil apodization for modulating the lens amplitude transmission profile.

2 Claims, 5 Drawing Sheets

Pupil function

300

Imaging (PSF)

302

Pupil function

304

Imaging (PSF)

306

CONTACT LENS WITH IMPROVED VISUAL PERFORMANCE AND MINIMIZED HALO UTILIZING PUPIL APODIZATION

BACKGROUND OF THE INVENTION

1. Field of the Invention

The present invention relates to ophthalmic lenses, and more particularly to soft contact lenses comprising a design for modulating the lens amplitude transmission profile, which combines the concepts of smooth pupil transition and higher edge absorption, to offer improved visual performance with reduced pupil edge wavefront aberration, reduced halo and reduced light scattering.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia. Astigmatism is an optical or refractive defect in which an individual's vision is blurred due to the inability of the eye to focus a point object into a focused image on the retina. Astigmatism is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Soft contact lenses have been widely used as an effective visual correction device by offering different types of wavefront aberrations, including defocus and astigmatism, all with a high degree of comfort and ease of use for the patient. However, some patients experience a halo effect and/or scattering of light during high or strong light exposure, for example, during night driving. This phenomenon is due to light diffraction at the patients' pupil edge and multiple reflections within the soft contact lens itself. Accordingly, there exists a need for a soft contact lens that provides patients with a healthy and comfortable means for ensuring optimal visual correction with reduced pupil edge wavefront aberration, reduced halo and reduced light scattering.

SUMMARY OF THE INVENTION

The contact lenses with improved visual performance and minimized halo utilizing pupil apodization in accordance with the present invention overcomes the disadvantages associated with the prior art as briefly set forth above.

In accordance with one aspect, the present invention is directed to soft contact lens having improved visual performance. The soft contact lens comprising an optical region, a peripheral region surrounding the optical region, and a system pupil function having an amplitude modulation component and a phase modulation component applied across at least a portion of the optical region and the peripheral region, the amplitude modulation component comprising a smooth transition function.

Halo and light scattering are primarily caused by two components of a soft contact lens. The first component is from the optical diffraction at the edge of the pupil, and the second component is from the multiple internal reflections/light scattering within the material forming the soft contact lens. In order to overcome or minimize the light scattering or halo effects, the soft contact lens transmission profile is altered relative to current soft contact lens designs. In accordance with the present invention, a smooth pupil apodization function is applied to the lens design to eliminate or substantially minimize the optical diffraction at the edge of the pupil while applying higher absorption at the lens edge will substantially reduce and preferably eliminate the multiple optical reflections with the soft contact lens.

Contact lenses, and more specifically, soft contact lenses are designed to correct sphere power and/or cylindrical power refractive error. However, because of higher order aberrations, optical rays refracted at the pupil edge or soft contact lens edge may not converge precisely into the image point and thus a blurry image may be observed. This pupil edge or soft contact lens edge wavefront aberration induced blurry image may degrade overall lens vision correction performance. By applying a smooth pupil apodization function, the pupil edge or soft contact lens edge has a stronger absorption and light rays passing through the pupil edge or soft contact lens edge will have significantly reduced intensity and thus the edge wavefront aberration will play a significantly reduced role in the overall retinal image. Basically, by applying a smooth pupil apodization function, better lens vision correction performance may be achieved.

Mathematically, an optical system may generally be described by its phase modulation function and its amplitude transmission function. Typically; however, in current state of the art soft contact lenses, only phase modulation is utilized to incorporate optical characteristics into the soft contact lens. In the present invention, the soft contact lenses are designed to modulate the lens amplitude transmission profile, which incorporates the concepts of smoothed pupil transition and higher edge absorption together, along with phase modulation to ensure optimal vision correction while substantially minimizing or eliminating lens halo, reducing pupil edge wavefront aberration, and light scattering.

The soft contact lens of the present invention is simple to manufacture utilizing standard manufacturing techniques and thus provide more comfortable, healthy and clear vision at a reasonable cost.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1A:
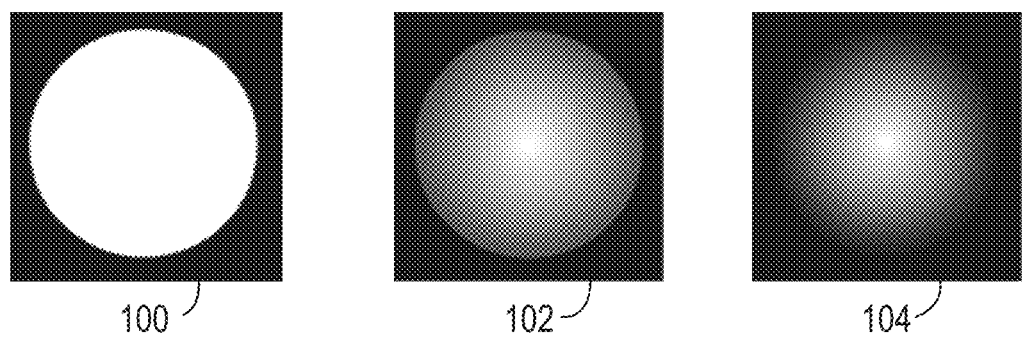
FIG. 1A is a representation of different pupil apodization design in accordance with the present invention.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then discarded, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

An optical system may be fully described by its optical transfer function (modulation transfer function and phase transfer function). The optical transfer function may be determined by the autocorrelation of the system pupil function $P(x,y)$ which is given by $$P(x,y) = A(x,y) \exp[jW(x,y)]. \tag{1}$$

The system pupil function $P(x,y)$ includes both an amplitude modulation component $A(x,y)$ and a phase modulation component $W(x,y)$, wherein $\exp[jW(x,y)]$ is the imaginary component of the phase term. In the current design of soft contact lenses, the optical phase variation profile, $W(x,y)$, is modified and improved to enhance vision; however, as may be readily seen from equation (1), the optical system pupil function $P(x,y)$ also depends on or is a function of its amplitude modulation function $A(x,y)$. In accordance with the present invention, by specifically engineering the amplitude modulation function $A(x,y)$, soft contact lens optical correction performance may be further improved in addition to the improvements made by manipulating $W(x,y)$.

These additional improvements relate to pupil edge wavefront aberrations and halo, specifically in reducing both.

Typically, a smoothed transition function may be applied to the amplitude modulation function $A(x,y)$ which in this exemplary embodiment is given by $$A(r) = \exp(-\alpha^*(r^2/r_0^2)), \tag{2}$$

wherein $r = \sqrt{(x^2+y^2)}$, $r_0$ is the optical zone radius and a is a constant, which as is explained in greater detail subsequently, that determines the type of pupil apodization. In the present invention, the amplitude modulation function is any value other than unity. It is important to note that equation (2) is given in cylindrical coordinates rather than in Cartesian coordinates while equation (1) is given in Cartesian coordinates. It is also important to note that transfer functions other than equation (2) may be utilized in determining the optical system pupil function $P(x,y)$.

Figure 1B:
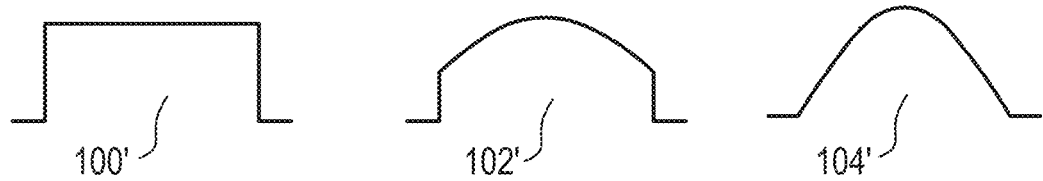
FIG. 1B is the corresponding light transmission profile of the different apodization designs of FIG. 1A.

In accordance with one exemplary embodiment, an apodized soft contact lens may be designed utilizing equations (1) and (2) and the resulting visual acuity may be simulated with eye models. As illustrated in FIG. 1A, a different magnitude of $\alpha$ will give various types of pupil apodization. In the first panel 100, α is equal to 0, which is the current state of the art in soft contact lenses, in the second panel 102, a is approximately 0.5 and in the third panel 104, α is approximately 1. FIG. 1B also indicates the corresponding transmission profile of pupil function 100', 102' and 104' for each a in FIG. 1A. As can be seen from the three panels, as the apodization is made stronger, there is less impact from pupil edge wavefront aberration and less halo, but less light also is transmitted. This is the tradeoff; namely, transmitted light versus reduced halo and edge wavefront aberration impact. As illustrated in the third panel 104 of FIG. 1A, the edge of the lens transmits less light.

Figure 2:
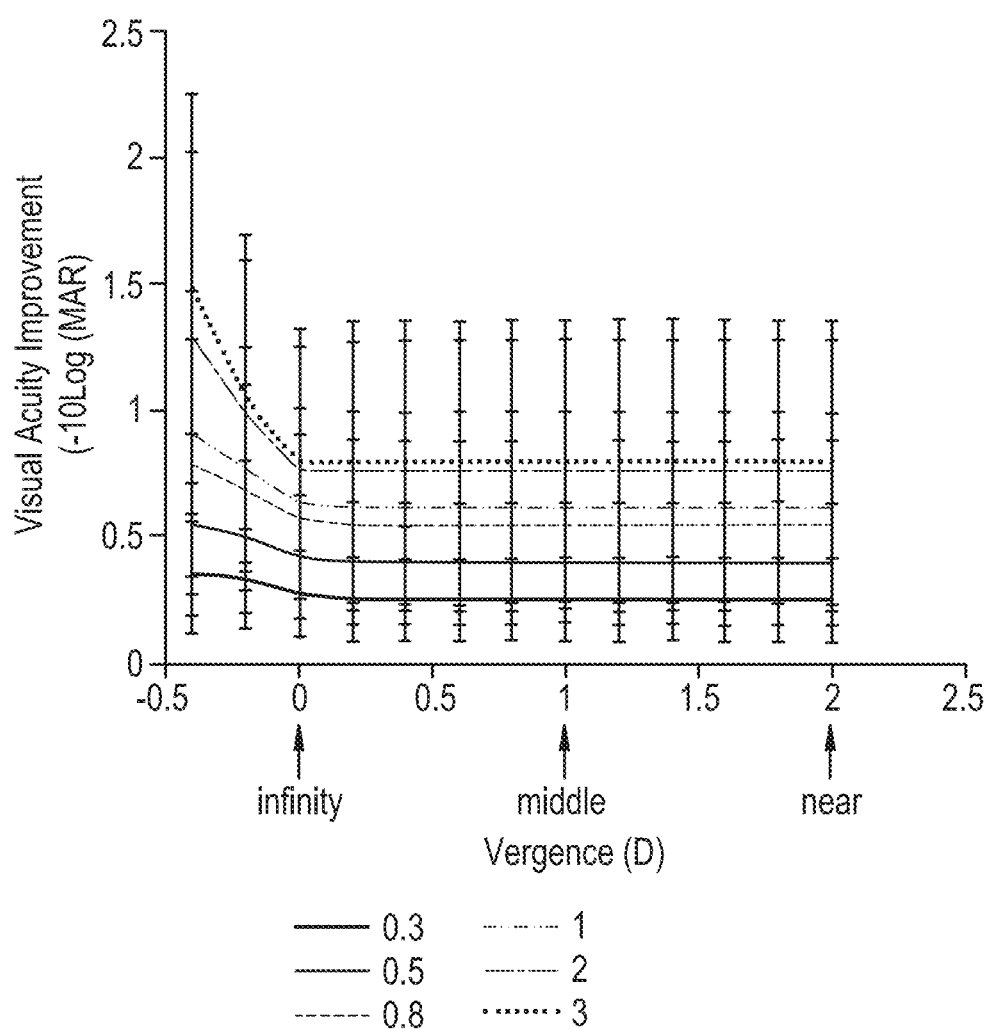
FIG. 2 is a graphical representation of the average and standard deviation of the visual acuity improvement versus vergence as calculated in accordance with the present invention.
Figure 3A:
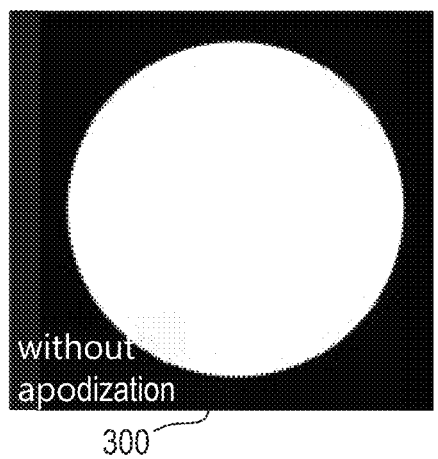
FIGS. 3A-3D illustrate pupil function and point spread function with and without apodization in accordance with the present invention.
Figure 3B:
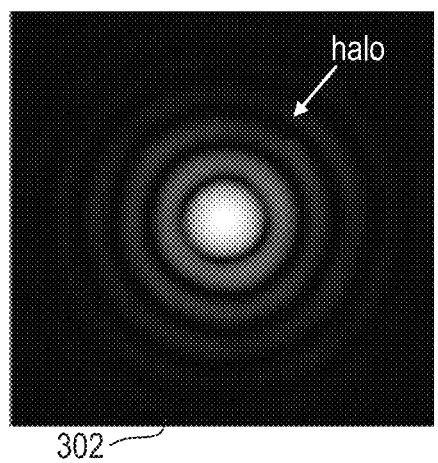
Figure 3C:
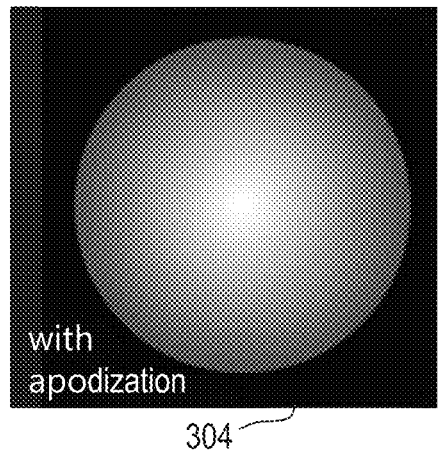
Figure 3D:
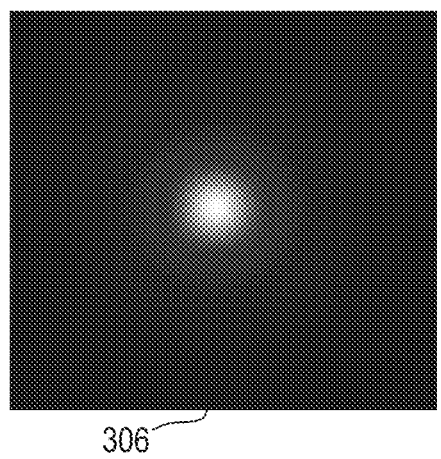

As set forth above, an apodized soft contact lens may be designed utilizing equations (1) and (2) and the resulting visual acuity may be simulated with eye models. The amount of ocular spherical aberration (SPHA), an indicator of visual performance, may be obtained through the use of the eye model. In the present invention, an eye model was developed that summarized the averaged human ocular spherical aberration and its distribution or standard deviation across a predetermined population. More specifically, the ocular spherical aberration distribution was obtained by the clinical measurement of patient eyes whose age vary between 20 to 60 years and with a refractive error ranging from +8 D to −12 D (predetermined population). Modeling was then applied to summarize all the measured ocular spherical aberration information and a mathematical function was utilized to describe the average and standard deviation of the ocular spherical aberration for patients with different ages and different refractive errors. Using the eye model, a Monte-Carlo simulation was further conducted over multiple eyes across the predetermined population. A regular spherical lens with different magnitudes of apodization, indicated by a, was fitted with multiple eyes, which is generated from the eye model, individually and visual acuity (VA) was calculated respectively. The same spherical lens without apodization was also fitted with the same group or population of patient eyes and the visual acuity was also calculated individually. For each individual eye, the difference in visual acuity between an eye having a soft contact lens with apodization and a soft contact lens without apodization was calculated and defined as visual acuity improvement. FIG. 2 is a graphical representation of the average and standard deviation of the visual acuity improvement as calculated versus vergence. In making the calculation, α was varied as indicated in the legend from 0.3 to 3.0, $r_0$ was fixed or held at 4 and r was varied between 0 to 4. As illustrated, different amounts of apodization (varying α) demonstrates different levels of visual acuity improvement. With stronger apodization, i.e. larger a, a higher level of improvement in visual acuity is observed. As an example, where a equals 0.8, the averaged total visual acuity improvement is above the 0.5 line. This is reasonable since stronger apodization results in a smaller "effective" pupil size. In terms of visual acuity, α equal to 3 provides the largest improvement in visual acuity as illustrated in FIG. 2 but the tradeoff with light transmission must be remembered.

The standard deviation of the visual improvement is really due to the ocular spherical aberration variation within the population. In general, a patient with higher positive ocular spherical aberration will benefit more than that experienced with a zero or negative ocular spherical aberration patient. The interaction between ocular spherical aberration and apodization has been investigated and is known in the art. It is very important that the improvement in visual acuity at night can effectively minimize human night myopia. On average, positive ocular spherical aberration exists in human eyes. This positive ocular spherical aberration may play a more significant role at night due to large pupil size in low light (dilation). This increased amount of ocular spherical aberration at night may contribute to night myopia effects. By applying smooth pupil apodization in accordance with the present invention, edge light intensity may be reduced thereby reducing night myopia. In other words, night myopia reduction is a direct result of reducing edge wavefront aberration.

Not only can visual acuity be improved via the present invention, but halo (diffraction at pupil edge) and light scattering (multiple reflections at lens edge) may be significantly reduced with a smooth transition of pupil transmission. This reduction in halo and light scattering may be demonstrated with optical ray tracing. As illustrated in FIG. 3, much weaker halo rings may be observed in the final image, point spread function 306, with an apodized pupil function 304. More specifically, as shown, without apodization pupil function 300, the point spread function 302 shows substantial halo. As described above, a significant portion of light scattering is due to light reflection at the lens or pupil edge. By applying apodization, the lens edge will have more absorption of light thereby reducing light scattering FIGS. 4A and 4B described in detail below illustrate this effect.

Figure 4A:
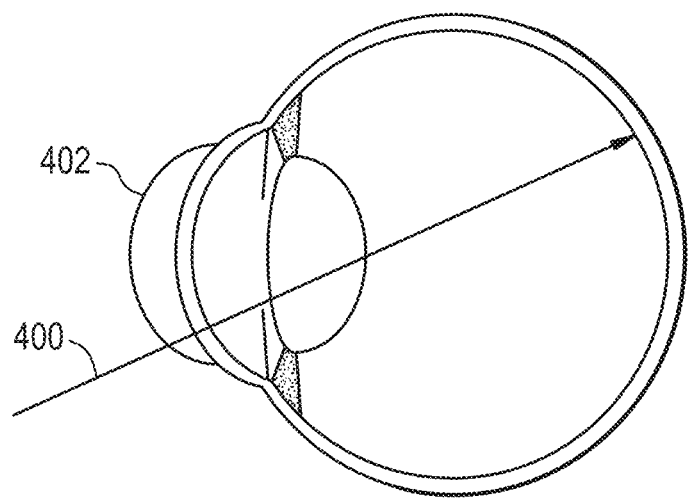
FIGS. 4A and 4B illustrate light entering the peripheral portion of a soft contact lens with no apodization and light entering the peripheral portion of a soft contact lens with apodization in accordance with the present invention.
Figure 4B:
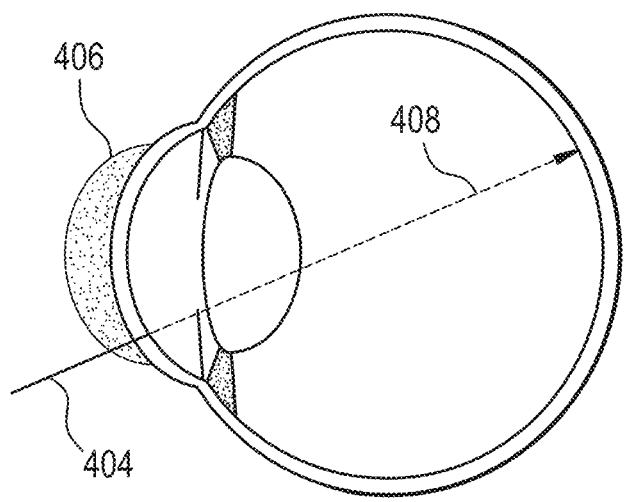
Figure 5:
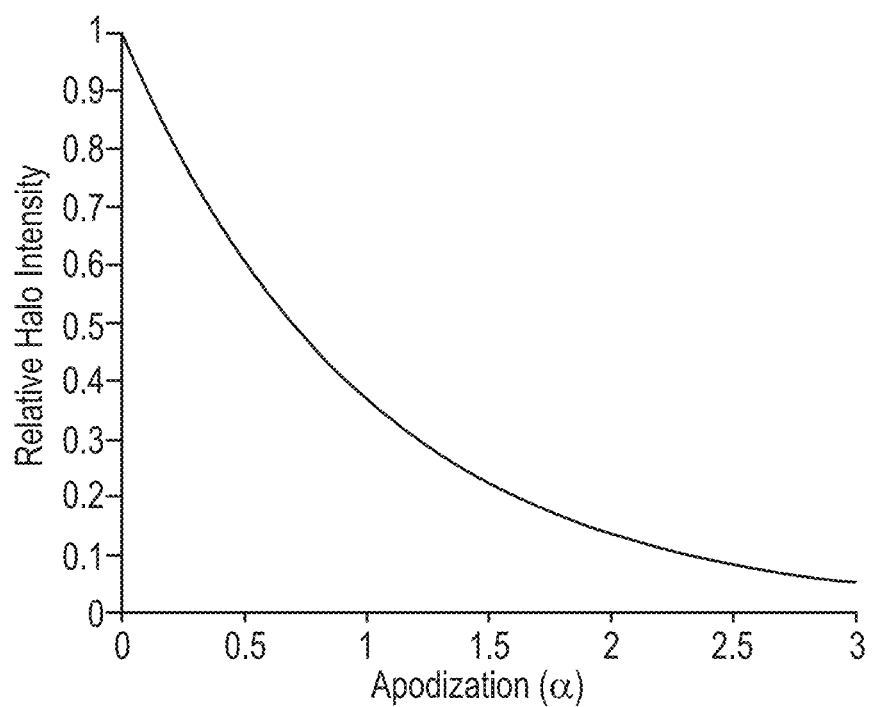
FIG. 5 is a graphical representation of relative halo intensity versus apodization in accordance with the present invention.

A significant problem with halo results from high illumination light at night. During night driving, strong incoming vehicle beam illumination results in halo formation in the driver's peripheral vision. FIG. 4A illustrates light 400 entering the peripheral portion of a soft contact lens 402 with no apodization and FIG. 4B illustrates light 404 entering the peripheral portion of a soft contact lens with apodization 406. As shown, the apodization reduces the intensity of this incident peripheral light 404 as indicated by dashed line 408. Assuming an optical beam entering from the pupil edge, FIG. 5 indicates the halo intensity with different amounts of apodization. When α equals 0.8, the halo intensity is less than half (0.45) of the halo intensity without pupil apodization. With decreased halo, the light intensity entering the pupil will continue to decrease and typically α should be less than 10 for comfortable vision. With an equal to 10, the total transmission of light is 11.1 percent. In accordance with the present invention, α preferably varies between 0.1 and 10.

The apodization of the soft contact lens in accordance with equations (1) and (2) may be manufactured with a thin coating of neutral density filter with a transmission of varying transmissivity over the optical zone of the lens. As is known in the art, a neutral density filter blocks uniformly across a spectrum. This neutral density filter coating may be applied or achieved utilizing any suitable means including coating and printing technology. In addition, any number of suitable coatings may be utilized. The coating may be applied to, on or in the lens itself.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A soft contact lens having improved visual performance, the soft contact lens comprising:
   an optical zone surrounding a lens center; and
   a peripheral zone surrounding the optical zone and extending to a lens edge, wherein the contact lens is configured with a smooth pupil apodization function centered around said lens center and extending to said lens edge to modulate the amplitude transmission profile of the soft contact lens such that transmissivity of the lens decreases continuously from the lens center to the lens edge, a neutral density filter is applied to the soft contact lens to implement the smooth pupil apodization function, the smooth pupil apodization function is expressed mathematically as $A(r)=\exp(-\alpha*(r^2/r_0^2))$, wherein in making the calculation for $A(r)$ $\alpha$ ranges between 0.3 and 3.0, $r_0$ is set to 4 mm, and r ranges between 0 and 4.0 mm.

2. The soft contact lens according to claim 1, wherein the neutral density filter reduces halo introduced by optical ray multiple reflections within the soft contact lens as compared to the soft contact lens without the neutral density filter.

\* \* \* \* \*